United States Patent [19]

Beeskow et al.

[11] 4,273,030
[45] Jun. 16, 1981

[54] PRESSURE RELIEF VALVE FOR THE WORKING PRESSURE OF A SERVO-STEERING SYSTEM

[75] Inventors: Bruno Beeskow, Bietigheim; Egon Bauer, Göppingen; Wolfgang Pfundstein, Stuttgart, all of Fed. Rep. of Germany

[73] Assignee: Daimler-Benz Aktiengesellschaft, Stuttgart, Fed. Rep. of Germany

[21] Appl. No.: 883,781

[22] Filed: Mar. 6, 1978

[30] Foreign Application Priority Data

Mar. 8, 1977 [DE] Fed. Rep. of Germany ....... 2710001

[51] Int. Cl.³ ...................... F15B 13/14; F15B 13/042
[52] U.S. Cl. ....................................... 91/450; 91/372; 91/434; 91/451
[58] Field of Search ................. 91/371, 450, 451, 370, 91/372, 373, 434

[56] References Cited

U.S. PATENT DOCUMENTS

| | | | |
|---|---|---|---|
| 3,532,027 | 10/1970 | MacDuff | 91/371 |
| 3,633,462 | 1/1972 | Goscenski | 91/450 |
| 3,922,953 | 12/1975 | Strauff | 91/371 |
| 3,978,770 | 9/1976 | Strauff | 91/434 |
| 4,022,110 | 5/1977 | Strauff | 91/371 |
| 4,051,766 | 10/1977 | Strauff | 91/451 |

Primary Examiner—Paul E. Maslousky
Attorney, Agent, or Firm—Craig & Antonelli

[57] ABSTRACT

A pressure relief valve for the working pressure of a servo-steering mechanism of a vehicle, with a pressure medium connection between a high pressure connection adapted to be placed under a working pressure and a zero connection adapted to be placed under a lower pressure, whose valve-adjusting member is retained in a normal rest position closing off the pressure medium connection during normal conditions by a control device operating as a function of an operating magnitude of the servo-steering mechanism and which upon exceeding a critical value of the operating magnitude is adapted to be displaced into a by-pass position more or less opening up the pressure medium connection; the control device thereby operates in dependence on the load of the servo-steering mechanism while the by-pass position is independent of the angle of rotation of the steering shaft of the servo-steering mechanism.

30 Claims, 3 Drawing Figures

PRESSURE RELIEF VALVE FOR THE WORKING PRESSURE OF A SERVO-STEERING SYSTEM

The present invention relates to a pressure relief valve for the working pressure of a servo-steering system of a vehicle, with a pressure medium connection between a high-pressure connection adapted to be placed under working pressure and a zero or neutral connection adapted to be placed under a lower pressure, whose valve-adjusting member is held during normal conditions in a rest position blocking the pressure medium connection by a control device operating in dependence on an operating magnitude of the servo-steering system and upon exceeding a critical value of the operating magnitude is adapted to be moved into a by-pass or shut-off position more or less opening up the pressure medium connection.

With a pressure relief valve of this type according to an internal development of the assignee of the present application (German Patent Application P No. 26 15 219.2), the valve-adjusting member is displaced into the by-pass or shut-off position by the steering shaft operating as control device, when the maximum wheel deflection is adjusted by the servo-steering mechanism. The control device is thus dependent on the steering adjusting path of the servo-steering system (angle of rotation of the steering shaft). It is achieved with such a pressure relief valve especially in connection with heavy and medium heavy commercial vehicles to relieve the steering linkage and the pressure pump of the servo-steering mechanism with fully deflected or turned-in wheels.

In contradistinction thereto, it is the aim of the present invention to provide an overload protection for the steering linkage and the fastenings of the servo-steering mechanism for all wheel steering deflections. This is especially important for passenger motor vehicles, respectively, more light-weight commercial vehicles. With these vehicle types, an overload may occur, for example, when the vehicle parked at the curve, after the starting of the engine, is moved in the direction toward the road center during standstill by a deflection of the steering wheel whereby the one steered vehicle wheel will be supported against the curb edge.

Starting with a pressure relief valve of the aforementioned type, the underlying problems are solved in an advantageous manner according to the present invention in that the control device operates in dependence on the load of the servo-steering mechanism and the by-pass or shut-off position is independent of the steering adjusting path of the servo-steering mechanism.

Servo-steering systems operate normally with a control mechanism limiting the working pressure to a maximum value. The application of the present invention to such servo-steering systems is, however, meaningful because an external steering load moment applied by hand is adapted to be superimposed on the servo-assist, whereby after reaching the maximum value of the working pressure, an overload can be caused manually. However, in order to be able to utilize the full servo-assist in the application of the present invention to such a servo-steering system, it is advantageous that the valve-adjusting member is held in its normal rest position in connection with the pressure-relief valve according to the present invention if the actual value of the working pressure is lower than the maximum value.

The pressure relief valve according to the aforementioned German application operates in a servo-steering system with a control valve adjusting the actual valve of the working pressure, whose valve-adjusting member is at a predetermined position relative to the valve housing when the actual value is equal to the maximum value.

In application of the present invention to such a pressure-relief valve, the arrangement may also be made according to the present invention in such a manner that the valve-adjusting member of the control valve for the working pressure operates as control device and upon reaching its position corresponding to the maximum value, brings the valve-adjusting member of the pressure-relief valve into the by-pass or shut-off position.

In order to avoid with this pressure-relief valve according to the present invention that during the shut-off or reduction of the working pressure, the reaction moment at the steering hand wheel drops off, provision may be made according to the present invention that the valve-adjusting member of the control valve for the working pressure is absorbed by springy means operating in the sense of an increase of the external manual steering load moment adapted to be felt at the steering hand-wheel, when the valve-adjusting member of the pressure-relief valve is displaced into its shut-off or by-pass position.

An advantageous embodiment of the pressure-relief valve according to the present invention which operates in dependence on the position of the control valve for the working pressure is such that the valve-adjusting member of the control valve adjusting the working pressure includes a control section for the pressure relief which, upon reaching the position of the valve-adjusting member for the maximum value of the working pressure, establishes a pressure medium connection between a valve connection at the control valve which is under working pressure and a valve connection of the control valve which is under a lower pressure.

Accordingly, it is an object of the present invention to provide a pressure-relief valve for the working pressure of a servo-steering system for motor vehicles which avoids by simple means the aforementioned shortcomings and drawbacks encountered in the prior art.

Another object of the present invention resides in a pressure-relief valve for the working pressure of a servo-steering mechanism which provides an overload protection for the steering linkage and the fastening points of the servo-steering mechanism at all wheel deflections.

A further object of the present invention resides in a pressure-relief valve for the working pressure of a servo-steering mechanism in which the control device operates in dependence on the load of the servo-steering mechanism while the shut-off or by-pass is independent of the steering adjusting path of the servo-mechanism.

Still another object of the present invention resides in a pressure-relief valve for the working pressure of a servo-steering system which is simple in construction, yet permits the utilization of the full servo-assist under all conditions without danger to the steering mechanism.

Another object of the present invention resides in a servo-steering mechanism of the type described above, which achieves all of the aforementioned aims and objects by extremely structurally simple and effective means yet assures a good road feel at the steering wheel.

These and other objects, features and advantages of the present invention will become more apparent from the following description when taken in connection with the accompanying drawing which shows, for purposes of illustration only, two embodiments in accordance with the present invention, and wherein.

Figure 1:
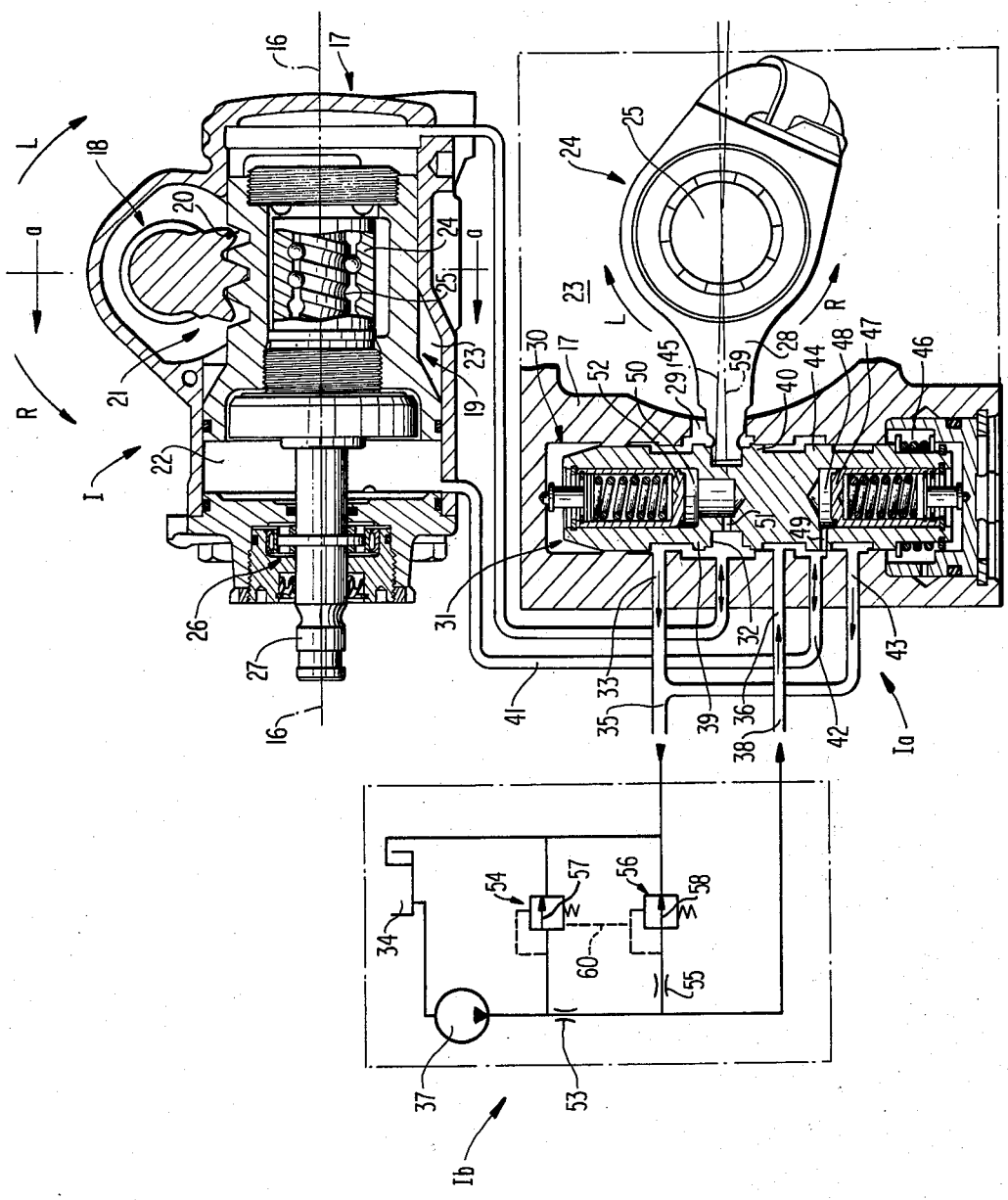
FIG. 1 is a somewhat schematic view, partly in cross section, of a servo-steering system including a pressure-relief valve according to the present invention, and more particularly in two cross sections I and Ia which are schematically interconnected by lines with a schematic diagram Ib of the associated hydraulic installation.
Figure 2:
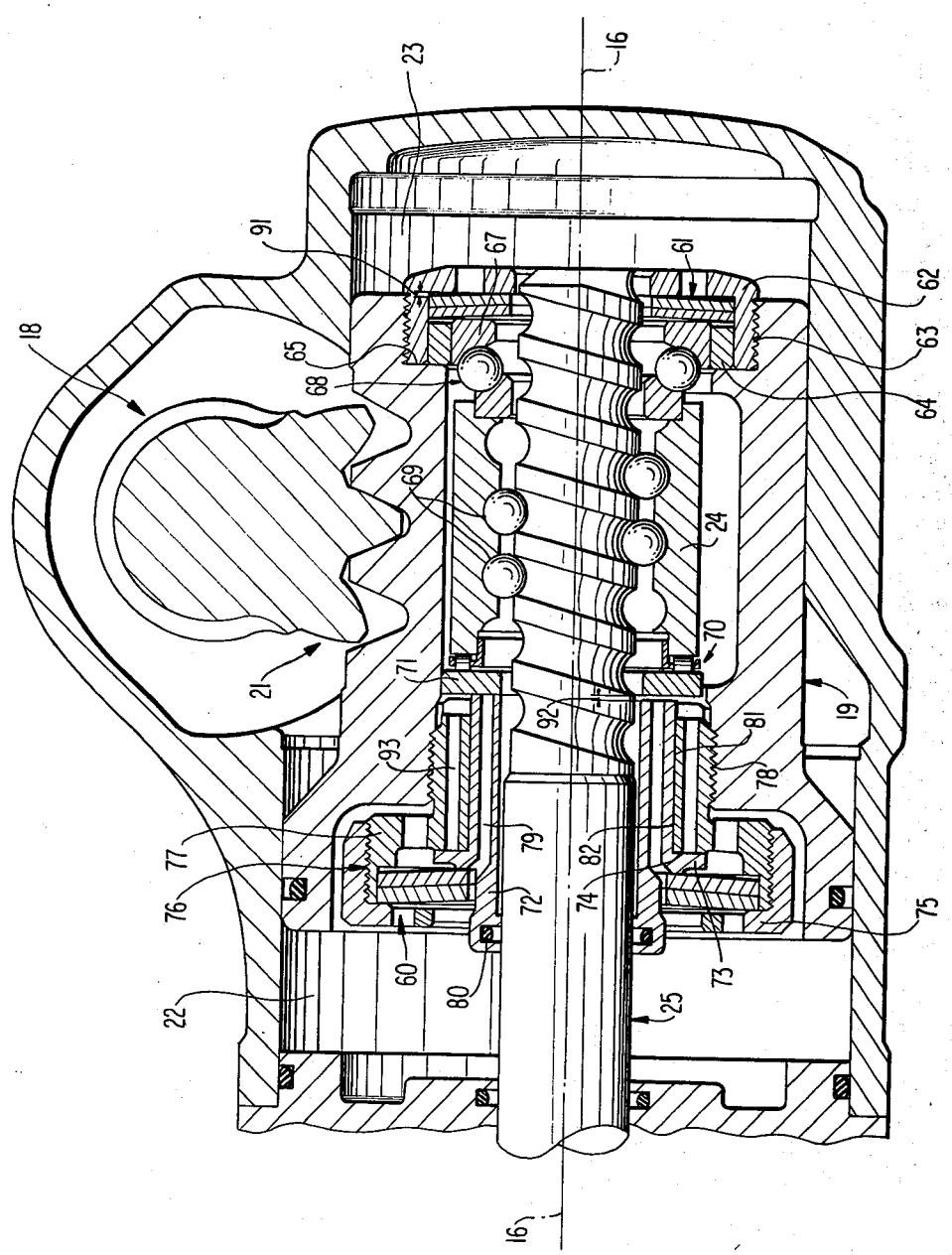
FIG. 2 is a cross-sectional view, on an enlarged scale, through the cross section I of FIG. 1 and illustrating additional details thereof.

Referring now to the drawing wherein like reference numerals are used throughout the various views to designate like parts, the embodiment of the pressure-relief valve according to the present invention is illustrated in the structural realization thereof in its integration into the servo-steering system of FIG. 1, whose mechanical and hydraulic function will be explained at first by reference to FIG. 1. The cross section I of FIG. 1 lies in a plane containing the axis 16—16 of a steering gear housing generally designated by reference numeral 17 of the servo-steering mechanism and constructed as working cylinder, which plane is perpendicular to a steering shaft generally designated by reference numeral 18 of the servo-steering mechanism. The steering shaft 18 is rotatably supported in the housing 17 in a conventional manner (not shown) and is adapted to be connected in a conventional manner with the steered vehicle wheels. The cross section Ia is placed through the servo-steering mechanism corresponding to the line a—a of the cross section I.

A working piston generally designated by reference numeral 19 which is displaceable in the directions of the axis 16—16, is in operative connection with a toothed segment generally designated by reference numeral 21 made in one piece with the steering shaft 18 by means of a toothed rack profile generally designated by reference numeral 20. A steering nut 24 is limitedly rotatably supported in the working piston 19 subdividing the steering gear housing 17 into two working pressure chambers 22 and 23, whereby the steering nut 24 is helically movably connected with a steering worm 25 coaxial to the axis 16—16. In the directions of the axis 16—16, the steering nut 24 is fixed relative to the working piston 19 and the steering worm 25 is fixed relative to the steering gear housing 17. A steering spindle part 27 of the steering worm 25 which extends outwardly through the steering gear housing 17 by means of a roller bearing arrangement 26, is adapted to be coupled in a conventional manner with the steering hand wheel. The steering nut 24 is provided with a control arm 28 (cross section Ia) made in one piece therewith and extending radially to the axis 16—16, which extends through a slot opening 29 of the steering gear housing 17, that connects a housing bore generally designated by reference numeral 30 for a control slide valve member generally designated by reference numeral 31 with the working pressure chamber 23. The free end of the control arm 28 engages in a circumferential groove 32 of the control slide valve 31 in a play-free yet pivotal manner. The pressure medium connections between the slot opening 29 serving at the same time as a valve connection and two further valve connections, namely, a return connection 33 and a pressure medium 36 terminating in the housing bore 30 of a return line 35 leading to a hydraulic tank 34 and of a pressure line 38 fed by a pressure pump 37, respectively, are controlled by throttling by means of two collar-like or spool-like control sections 39 and 40 of the control slide valve member 31.

The working pressure chamber 22 is connected by way of a housing channel 41 with a valve connection 42 terminating in the housing bore 30, whose pressure medium connections to the pressure medium connection 36, respectively, to a further valve or return connection 43 of the return line 35 terminating in the housing bore 30, are controlled by a further collar-like or spool-like control section 44 of the control slide valve member 31.

In the neutral position of the control slide valve member 31 for the straight drive indicated in dash and dotted lines at 45—in which with a non-actuating steering wheel, the control slide valve member 31 is retained by a centering spring 46—the valve connections 29, 36 and 42 are in essentially unthrottled connection with the return line 35 so that a pressure equilibrium is established at the working piston 19.

During a right deflection of the steering wheel, the control arm 28 is deflected out of the neutral position 45 in the direction of the arrow R in cross section Ia so that the control slide valve member 31 establishes a higher pressure in the working pressure chamber 22 by throttling of the two pressure medium connections between the valve connections 29 and 36 on the one hand by means of the control section 40 and the valve connections 42 and 43, on the other, by means of the control section 44. The differential pressure force resulting therefrom at the working piston 19 assists the actuation of the steering shaft 18 in the direction of rotation of the arrow R in cross section I.

During a left deflection of the steering hand wheel, the control arm 28 is deflected in the direction of the arrow L in the cross section Ia, as a result of which the control slide valve member 31 establishes a higher pressure in the working pressure chamber 23 in a corresponding manner. The differential pressure force resulting therefrom at the working piston 19 assist the actuation of the steering shaft 18 in the direction of rotation of the arrow L in cross section I.

The control slide valve 31 contains a reaction piston 47 operating in a reaction pressure chamber 48—which is continuously connected with the valve connection 42 by way of a slide valve channel 49—which reaction piston 47 will be able to counteract the deflection of the control slide valve member 31 during the right deflection of the steering wheel and thus will be able to let a manual steering moment proportional to the working pressure be noticeable or felt at the steering wheel.

Furthermore, the control slide valve member 31 includes a reaction piston 52 operating in a reaction pressure chamber 50—which is constantly connected with the valve connection 29 by way of a slide valve channel 51—which reaction piston 52 will be able to counteract the deflection of the control slide valve member 31 during the left deflection of the steering wheel and thus will be able to let a manual steering moment proportional to the working pressure be noticeable or felt at the steering hand wheel.

A quantity control valve generally designated by reference numeral 54 of conventional construction and operating in dependence on the pressure drop of a throttle 53 of the pressure line 38 is interconnected between the pressure line 38 and the return line 35 and adjusts a constant feed quantity per unit of time of the pressure pump 37 with varying pump rotational speeds.

A pressure limit valve 56 of conventional construction is connected to the section of the pressure line 38 disposed between the throttle 53 and the control valve 30, 31 under interconnection of a second throttle 55, which limits the pressure of the pressure line 38 and therewith the working pressure of the servo-steering system to a maximum value.

The quantity control valve 54 is controllingly influenced by the pressure limit valve 56 (indicated by the symbolic control line 60) by the use of conventional means so that—when the working pressure approaches the maximum value—the largest proportion of the excess feed quantity is by-passed by the quantity control valve 54 toward the tank 34.

As indicated by the arrows 57 and 58 shown in full lines, the quantity control valve 54 and the pressure limit valve 56 are each in a respective control position, i.e., the control slide valve member 31 has adjusted the working pressure to the maximum value.

In the illustrated position of the cross section Ia, this condition is shown for the right deflection of the steering hand wheel. After reaching the maximum value, the control arm 28 upon further rotation of the steering hand wheel, reaches the illustrated abutment position 59 with respect to the wall of the valve connection 29 so that the steering nut 24 is non-rotatably fixed for the right deflection and the steering worm 25 and therewith the hand wheel has a fixed mechanical drive connection with the steering shaft 18. An increase at will of the steering shaft moment is then possible only by an increase of the manual steering moment at the hand wheel.

Figure 3:
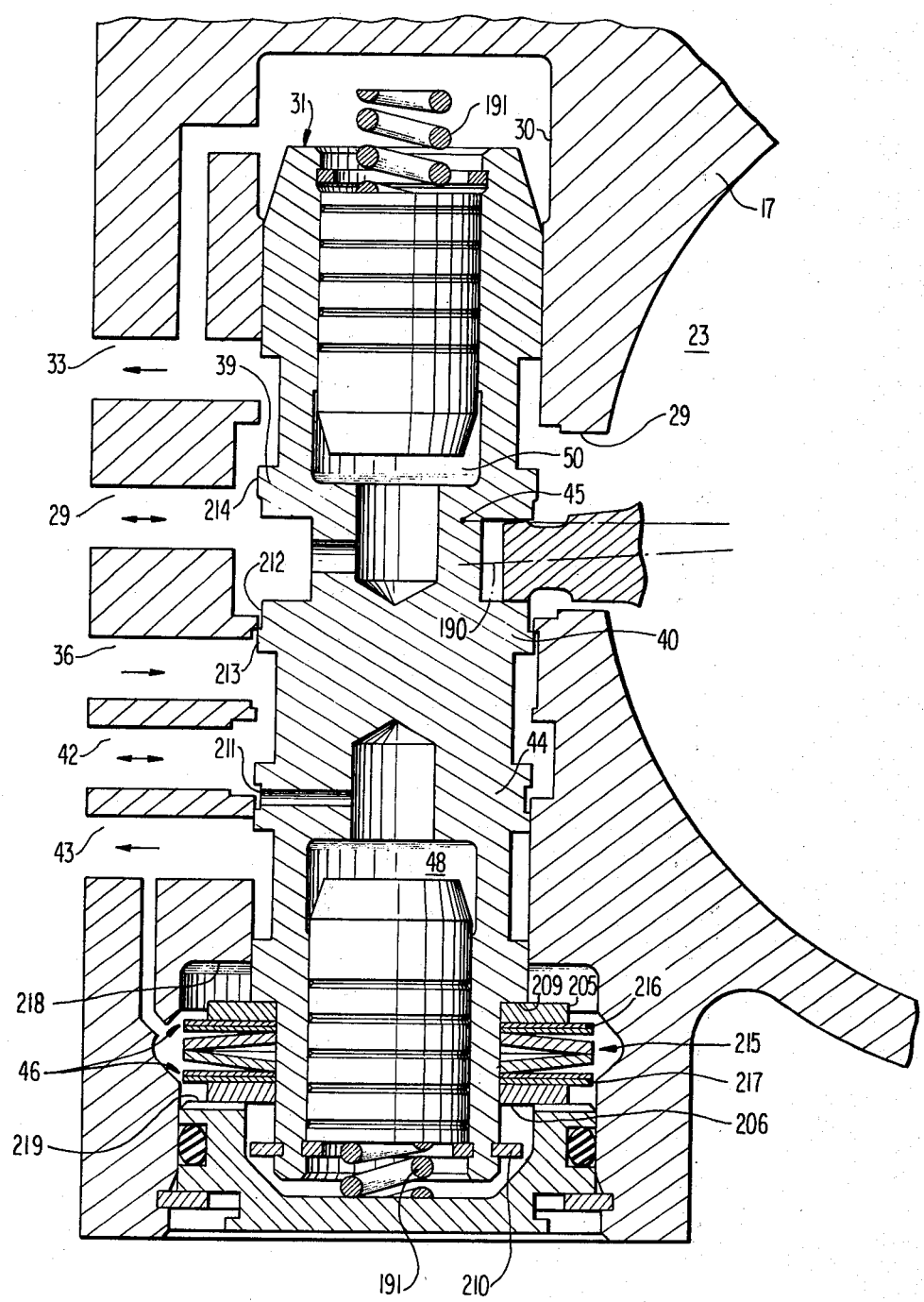
FIG. 3 is a preferred embodiment of a pressure-relief valve according to the present invention by reference to a cross section through the servo-steering system of FIG. 1 corresponding to the cross section Ia of FIG. 1.

In order to avoid such an increase at will of the steering shaft moment, when the working pressure has been brought to a critical value—for example, to the maximum value—the by-pass valve according to the present invention of FIG. 3 effects a shut-off or reduction of the working pressure. In this manner, the steering shaft moment can be kept constant or also reduced with an increase of the manual steering moment.

For this purpose, control sections 40 and 44 of the control slide valve member 31 are each provided with an undercut or offset pressure-relief area 212 and 211, respectively. If the control slide valve member 31 during a right-hand deflection passes over its position for the maximum value of the working pressure, the control section 39 opens up essentially unthrottled the connection between the valve connections 33 and 29 of the return line 35 and of the working pressure chamber 23—whereas the control section 40 essentially closes off with its further throttle area 213 the connection between the valve connections 29 and 36 of the working pressure chamber 23 and of the pressure pump 37. At the same time, the control section 44 of the control slide valve member 31 closes off the connection between the valve connections 42 and 43 of the working pressure chamber 22 and of the return line 35 so that the maximum value of the working pressure is adjusted. If the control slide valve member 31 now reaches the illustrated position 190, then the pressure relief area 212 of the control section 40 and the discharge of the valve connection 36 disposed in the housing bore 30 overlap each other. As a result thereof, a connection is established between the valve connections 36 and 33 of the pressure pump 37 and of the return line 35.

During the left deflection, the wide throttle area 214 of the control section 39 at first closes off the connection between the valve connections 29 and 33 of the working pressure chamber 33 and the return line 35, if the control slide valve member 31 passes over its corresponding position for the maximum value of the working pressure. The control section 44 thereby essentially closes the connection between the valve connections 36 and 42 of the pressure pump 37 and of the working pressure chamber 22. If the left deflection is increased therebeyond, then the pressure relief area 211 of the control section 44 overlaps with the discharge of the valve connection 36 disposed in the housing bore 30, as a result of which a connection is established between the pressure line 38 of the pressure pump 37 and the return line 35.

The respective reaction pressure chambers 50 and 48 are relieved by the pressure relief areas 211 and 212 and therewith the associated reaction spring 191 is shut off or rendered inoperable in its effect on the hand steering wheel. In order to absorb thereby the control slide valve 31 by elastic means, a spring package generally designated by reference numeral 215 with two relatively strong cup springs is provided which is supported between two spring packages 216 and 217 operating as centering spring generally designated by reference numeral 46 of each two relatively weak cup springs. The centering spring 46 is clamped-in between the cup springs 205 and 206 which are displaceably arranged between two abutments 209 and 210 at the control slide valve member 31 and are adapted to be supported at a respective counter-abutment 218 or 219 immovable relative to the housing 217.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A pressure-relief valve for a working pressure of a servo-steering mechanism having a steering shaft in a vehicle, comprising a pressure-medium connection between a high pressure pump connection operable to be placed under the working pressure and a return connection operable to be placed under a lower pressure, including valve adjusting means retained under normal conditions in a normal position closing the pressure-medium connection from communication with said return connection, and control means operating in dependence upon an operating magnitude of the servo-steering mechanism and operable upon exceeding a critical value of the operating magnitude so as to displace the valve-adjusting means into a by-pass position opening up the pressure-medium connection to a return line by means of said return connection, characterized in that the operating magnitude is an external load moment and the control means is operable in dependence on said external load moment of the servo-steering mechanism, and in that the valve-adjusting means is displaced into the by-pass position as a function of the load moment on the servo-steering mechanism substantially independently of the angle of rotation of said steering shaft of said servo-steering mechanism so as to decrease the working pressure of the servo-steering mechanism as manual torque on a steering wheel operatively connected with the servo-steering mechanism increases.

2. A pressure-relief valve according to claim 1, characterized in that the control means includes a control slide valve means.

3. A pressure-relief valve according to claim 1, for a servo-steering mechanism which includes a regulating means for limiting the working pressure of the servo-steering mechanism to a maximum value, characterized in that means are provided for retaining the valve-adjusting means in a normal position when an actual valve of the working pressure is lower than the maximum value.

4. A pressure-relief valve according to claim 3, characterized in that the control means includes a control slide valve means.

5. A pressure-relief valve according to claim 4, characterized in that the valve-adjusting means includes pressure-relief area means.

6. A pressure-relief valve according to claim 3, wherein the regulating means includes a control valve means for adjusting the actual value of the working pressure, the control valve means being adapted to be positioned in a predetermined control position when the actual value of the working pressure is equal to the maximum value, characterized in that the control valve means is adapted to adjust the working pressure so that, upon adjusting working pressure to a value corresponding to the maximum value, the control means displaces the valve-adjusting means into the by-pass position.

7. A pressure-relief valve according to claim 6, characterized in that elastic means are provided for causing an increase of a manual steering moment noticeable at a steering wheel when the valve-adjusting means is displaced into the by-pass position.

8. A pressure-relief valve according to claim 7, characterized in that said elastic means are constructed as spring means.

9. A pressure-relief valve according to claim 7, characterized in that the valve-adjusting means includes a control section adapted to relieve the working pressure upon reaching the maximum value and adapted to establish the pressure medium connection between the high pressure connection and the return connection.

10. A pressure-relief valve according to claim 9, with a servo motor having two working pressure chamber means, wherein, during a deflection of the steering wheel in a first direction, a first of the two working pressure chamber means is adapted to be placed under the working pressure while the second of the working pressure chamber means is placed under the lower pressure and, during a deflection of the steering wheel in a second direction, the second of the working pressure chamber means is placed under the working pressure and the first working pressure chamber means is placed under the lower pressure, characterized in that means are provided for constantly connecting the respective working pressure chamber means which is under the lower pressure with the return connection.

11. A pressure-relief valve according to claim 10, characterized in that means are provided for continuously connecting the high pressure connection with a pressure line of a pressure pump producing the working pressure.

12. A pressure-relief valve according to claim 11, characterized in that the retaining means for retaining the valve-adjusting means in a normal position includes centering spring means supported between two spring abutments adapted to come into abutment at a counter-abutment of a valve housing means and at a counter-abutment of the valve-adjusting means, the elastic means have a relatively steep spring characterized and are arranged in series with the centering spring means between the spring abutments, and in that the centering spring means have a relatively flat spring characteristic.

13. A pressure-relief valve according to claim 12, characterized in that the elastic means includes two springs each of which has raised end surfaces and in that the raised end surfaces are disposed opposite one another so as to enable an absorbing of the valve-adjusting means.

14. A pressure-relief valve according to claim 12, characterized in that the elastic means and the centering spring means are constructed in the same fashion.

15. A pressure-relief valve according to claim 1, for a servo-steering mechanism which includes a control valve means for adjusting an actual value of the working pressure, the control valve means being adapted to be positioned in a predetermined control position when the actual value of the working pressure is equal to a maximum value, characterized in that the control means is adapted to adjust the working pressure so that, upon adjusting the working pressure to a value corresponding to the maximum value, the control means displaces the valve-adjusting means into the by-pass position.

16. A pressure-relief valve according to claim 15, characterized in that elastic means are provided for causing an increase of a manual steering moment noticeable at a steering wheel when the valve-adjusting means is displaced into the by-pass position.

17. A pressure-relief valve according to claim 15, characterized in that the valve-adjusting means includes a control section adapted to relieve the working pressure upon reaching the maximum value and adapted to establish a pressure medium connection between the high pressure connection and the return connection.

18. A pressure relief valve according to claim 17, with a servo-motor having two working pressure chamber means, wherein, during a deflection of the steering wheel in a first direction, a first of the two working pressure chamber means is adapted to be placed under the working pressure while the second of the working pressure chamber means is placed under the lower pressure and, during a deflection of the steering wheel in a second direction, the second of the working pressure chamber means is placed under the working pressure and the first working pressure chamber means is placed under the lower pressure, characterized in that means are provided for constantly connecting the respective working pressure chamber means which is under the lower pressure with the return connection.

19. A pressure-relief valve according to claim 17, characterized in that means are provided for continuously connecting the high pressure connection with a pressure line of a pressure pump producing the working pressure.

20. A pressure-relief valve according to claim 17, for a servo-steering mechanism which includes spring means for retaining the valve-adjusting means in the normal position, the centering spring means are respectively supported between two spring abutments adapted to come into abutment at a counter-abutment of a valve housing means and at a counter-abutment of the valve-adjusting means, characterized in that elastic means are provided for absorbing the valve-adjusting means during a relief of the working pressure, the elastic means have a relatively steep spring characteristic and are arranged in series with the centering spring means between the spring abutments, and in that the centering spring means have a relatively flat spring characteristic.

21. A pressure-relief valve according to claim 20, characterized in that the elastic means includes two springs each of which includes raised end surfaces, and in that the raised end surfaces are disposed opposite one another so as to enable absorbing of the valve-adjusting means.

22. A pressure-relief valve according to claim 2, characterized in that the valve-adjusting means includes pressure-relief means.

23. A pressure-relief valve according to claim 22, for a servo-steering mechanism which includes a control valve means for adjusting an actual value of the working pressure, the control valve means being adapted to be positioned in a predetermined control position when the actual value of the working pressure is equal to a maximum value, characterized in that the control slide valve means is adapted to adjust the working pressure so that, upon adjusting the working pressure to a value corresponding to the maximum value, the control slide valve means displaces the pressure-relief means of the valve-adjusting means into a by-pass position.

24. A pressure-relief valve according to claim 23, characterized in that elastic means are provided for causing an increase of a manual steering moment noticeable at a steering wheel when the pressure relief means of the valve-adjusting means are displaced into the by-pass position.

25. A pressure-relief valve according to claim 23, characterized in that the control slide valve means includes a control section adapted to relieve the working pressure upon reaching the maximum value and adapted to establish a pressure medium connection between the high pressure connection and the return connection.

26. A pressure-relief valve according to claim 1, for a servo-steering mechanism which includes a centering spring means for retaining the valve-adjusting means in the normal position, the centering spring means are respectively supported between two spring abutments adapted to come into abutment at a counter-abutment of a valve housing means and at a counter-abutment of the valve-adjusting means, characterized in that elastic means are provided for absorbing the valve-adjusting means during a relief of the working pressure, the elastic means have a relatively steep spring characteristic and are arranged in series with the centering spring means between the spring abutments, and in that the centering spring means have a relatively flat spring characteristic.

27. A pressure-relief valve according to claim 26, characterized in that the elastic means includes two springs each of which includes raised end surfaces, and in that the raised end surfaces are disposed opposite one another so as to enable absorbing of the valve-adjusting means.

28. A pressure-relief valve according to claim 27, characterized in that the control means includes a control slide valve means.

29. A pressure-relief valve according to claim 28, characterized in that the valve-adjusting means includes a control section adapted to relieve the working pressure upon reaching the maximum value and adapted to establish the pressure medium connection between the high pressure connection and the return connection.

30. A pressure-relief valve according to claim 28, with a servo-motor having two working pressure chamber means, wherein during a deflection of the steering wheel in a first direction, a first of the two working pressure chamber means is adapted to be placed under the working pressure while the second of the working pressure chamber means is placed under the lower pressure, and during a deflection of the steering wheel in a second direction, the second of the working pressure chamber means is placed under the working pressure and the first working pressure chamber means is placed under the lower pressure, characterized in that means are provided for constantly connecting the working pressure chamber means which is under the lower pressure with the return connection.

* * * * *